United States Patent
Morgan et al.

(10) Patent No.: US 7,204,158 B2
(45) Date of Patent: Apr. 17, 2007

(54) FLOW CONTROL APPARATUS AND METHOD WITH INTERNALLY ISOTHERMAL CONTROL VOLUME FOR FLOW VERIFICATION

(75) Inventors: Daniel P. Morgan, Vacaville, CA (US); Warner C. Thelen, Dixon, CA (US)

(73) Assignee: Parker-Hannifin Corporation, Cleveland, OH (US)

(*) Notice: Subject to any disclaimer, the term of this patent is extended or adjusted under 35 U.S.C. 154(b) by 0 days.

(21) Appl. No.: 11/175,158

(22) Filed: Jul. 7, 2005

(65) Prior Publication Data

US 2006/0008328 A1   Jan. 12, 2006

Related U.S. Application Data

(60) Provisional application No. 60/585,981, filed on Jul. 7, 2004.

(51) Int. Cl.
*G01F 1/34* (2006.01)

(52) U.S. Cl. .................... 73/861.42; 406/10
(58) Field of Classification Search ............ None
See application file for complete search history.

(56) References Cited

U.S. PATENT DOCUMENTS

| | | | |
|---|---|---|---|
| 4,782,888 A | * | 11/1988 | Bardenheier ............ 165/210 |
| 5,925,829 A | | 7/1999 | Laragione et al. |
| 6,363,958 B1 | | 4/2002 | Ollivier |
| 6,450,200 B1 | | 9/2002 | Ollivier |

OTHER PUBLICATIONS

Arnberg, B.T., Two Primary Methods of Proving Gas Flow Meters, Symposium on Flow: Its Measurement and Control in Science and Industry, Paper No. 3-8-216, 1971.

* cited by examiner

*Primary Examiner*—Harshad Patel
(74) *Attorney, Agent, or Firm*—Antonelli, Terry, Stout & Kraus, LLP.

(57) ABSTRACT

An internally isothermal control volume of a flow verification system for measuring gas pressure drop relative to time to calculate flow rate has a thermal reservoir provided therein. The thermal reservoir is de-coupled from ambient effects so that the temperature of the thermal reservoir will be driven to the gas temperature during steady state flow of gas through the known volume and during gas expansion, will transfer heat to maintain a contrast gas temperature for accurate gas flow rate calculation with minimal effect from external influence during the verification process.

18 Claims, 3 Drawing Sheets

FLOW CONTROL APPARATUS AND METHOD WITH INTERNALLY ISOTHERMAL CONTROL VOLUME FOR FLOW VERIFICATION

RELATED APPLICATION

This application claims priority of U.S. provisional patent application No. 60/585,981 filed Jul. 7, 2004. The disclosure of the provisional application is hereby incorporated by reference.

TECHNICAL FIELD

The present invention relates to a flow control apparatus and method for controlling the delivery of gas, such as the delivery of a process gas to a semiconductor manufacturing tool, and to an improved flow verification system for use in the flow control apparatus and method.

BACKGROUND

Measuring the gas pressure drop relative to time (pressure rate of decay) in a known volume (control volume) is one method to calculate gas flow rate. Such a method is normally only used in calibration systems, where strict control of ambient conditions is possible, and where there is sufficient time allowed in the pressure drop operation (blowdown) to allow the gas to reach ambient temperature. The article "Two Primary Methods of Proving Gas Flow Meters" by B. T. Arnberg, Symposium on Flow: Its Measurement and Control in Science and Industry, Paper Number 3-8-216, 1971, states that this method is designed to provide the high accuracy required for calibration of transfer standards, but is too time consuming to be practiced for the routine calibration of flow meters. Arnberg notes that during a measurement test at least an hour was allowed for thermal equilibrium to be established before pressure and temperature measurements were made.

U.S. Pat. No. 5,925,829 to Laragione et al. discloses a method and apparatus for determining a rate of flow of gas by a rate of change of pressure. The method and apparatus are disclosed as being useful in the manufacture of mass flow controllers and mass flow meters to calibrate them. A gas container used as a control volume in the method and apparatus is maintained in a substantially isothermal or temperature invariant condition and means are provided within the container for maintaining the gas in isothermal relationship with the surroundings of the container. During the method, the container temperature is sensed and if temperature changes of greater than 0.01° C. per second are detected, the system waits during which time no gas is flowed. The sensed container temperature is used in the calculations to determine actual flow rate.

Gas temperatures in the control volume during these methods to calculate flow rate are affected by the nature of the gas expansion. As gas is removed from the control volume during the measurement process, the remaining gas expands. This causes the remaining gas to cool in a process referred to as adiabatic expansion. A process that is 100% adiabatic would indicate that there is no heat transfer to the gas during the pressure drop. A process that is 0% adiabatic would indicate that the gas temperature remains constant. This is referred to as isothermal expansion. In reality, in the aforementioned conventional methods and apparatus the gas expansion will typically be partially adiabatic, resulting in some temperature change during the blowdown process. The degree to which the process is isothermal is dependent on several factors, including: flow rate, temperature, temperature stabilization time, Reynolds number, and specific gas thermal characteristics.

Flow controllers for delivering gas used in production facilities, such as those used in delivering process gas in the fabrication of semiconductors, do not have the luxury of operating at standard pressure and temperature. It is often necessary to heat the flow controller to prevent condensation of a process gas. Process run times can be as short as several seconds, so that if a blowdown operation is to be performed during the delivery of a batch of process gas, then the blowdown operation must be very fast, on the order of one second or even shorter. There is no time at the end of the blowdown operation to allow the control volume to sit in a static condition in order to allow the control volume gas to reach ambient temperature as in the aforementioned known methods and apparatus.

Assignee's U.S. Pat. Nos. 6,363,958 B1 and 6,450,200 B1 disclose flow control of process gas in semiconductor manufacturing wherein measuring pressure drop relative to time in a known volume is performed to calculate flow rate. As disclosed therein, the reference capacity/control volume for the gas incorporates a temperature sensing element to measure the temperature of the gas inside the capacity at the conclusion of the flow verification operation to calculate the flow rate. However, because of the corrosive nature of many of the gases used in semiconductor fabrication, the temperature sensor must be isolated from the process gas. This results in a delay in the response time of the temperature sensor. Consequently, the indicated temperature at the end of the blowdown process will deviate from the actual gas temperature if there is any cooling of the gas due to adiabatic expansion. This will lead to an error in the calculated final molar volume of gas in the known volume and an error in the calculated flow rate which reduces the accuracy of the flow of process gas by the flow control apparatus. There is a need for an improved flow control apparatus and method of measuring gas pressure drop relative to time in a known volume to calculate gas flow rate, for use within a fluid circuit having a source of pressurized gas to be delivered at a controlled flow to a destination which make it possible to calculate the actual flow of gas with a high level of accuracy during the delivery.

SUMMARY

The present invention addresses the aforementioned need. The invention is directed to an improved flow control apparatus for use within a fluid circuit having a source of pressurized gas to be delivered at a controlled flow rate to a destination by the flow control apparatus, and to an improved method of measuring gas pressure drop relative to time in a known volume to calculate gas flow rate, which make it possible to calculate the flow of gas during gas delivery with a high level of accuracy, for any gas, using readily available gas property data.

A flow control apparatus of the invention comprises a flow line through which gas from a source of pressurized gas can be delivered. A flow control system of the apparatus in the flow line establishes a controlled flow rate for delivery of gas at a specified flow rate in accordance with a calibration of the flow control system. A flow verification system of the apparatus includes a known volume in the flow line upstream of the flow control system and a pressure sensor to measure gas pressure drop relative to time in the known volume when gas flow to the known volume is interrupted while gas flow from the known volume is continued. A controller calculates the actual flow rate of gas being delivered by the flow control apparatus using the measurement and, in case the actual flow rate does not agree with the specified flow rate, recalibrates the flow control system. A thermal reservoir provided in the known volume of the flow verification system is de-coupled from ambient effects so that the temperature of the thermal reservoir will be driven to the gas temperature during steady state flow of gas through the known volume, and will transfer heat to maintain a constant gas temperature during gas expansion when measuring pressure drop relative to time in the known volume. This minimizes the heat transfer to the exterior of the control volume so the gas is maintained at its own temperature, with minimal effect from external influences during the verification process.

The improved flow control apparatus of the invention enables the practice of the method of the invention of measuring gas pressure drop relative to time in a known volume to calculate gas flow rate, the method comprising flowing gas through a known volume in which a thermal reservoir de-coupled from ambient effects is provided so that the temperature of the thermal reservoir will be driven to the gas temperature during steady state flow of gas through the known volume, interrupting gas flow to the known volume while continuing gas flow from the known volume, and measuring gas pressure drop relative to time in the known volume as the thermal reservoir transfers heat to maintain a constant gas temperature as the gas expands.

The thermal reservoir in a disclosed embodiment of the invention is formed of fine wire with open spaces between sections of wire through which gas can flow to transfer heat between the flowing gas and the thermal reservoir. The thermal reservoir is provided in the known volume with a gap between the thermal reservoir and an interior wall of the body forming the known volume to minimize heat transfer to the exterior of the known volume and de-couple the thermal reservoir from ambient effects. The thermal reservoir is provided about a tube in the known volume which diverts the incoming gas flow through the entire internal volume of the control volume, ensuring consistent temperature of the thermal reservoir and the surrounding gas during steady state flow.

The flow control system of the apparatus includes a pressure regulator in the flow line to establish a regulated gas pressure in the line, and fixed orifice in the flow line downstream of the pressure regulator. The pressure regulator has an adjustable pressure setting for adjusting the controlled flow rate. The flow control system is recalibrated by the controller where from the measured gas pressure drop relative to time and the calculated actual flow rate obtained by the flow verification system, the actual flow rate does not correspond with the specified flow rate for delivery.

These and other features and advantages of the present invention become more apparent from the following detailed description of an embodiment of the present invention taken with the accompanying drawings.

DETAILED DESCRIPTION

Figure 1:
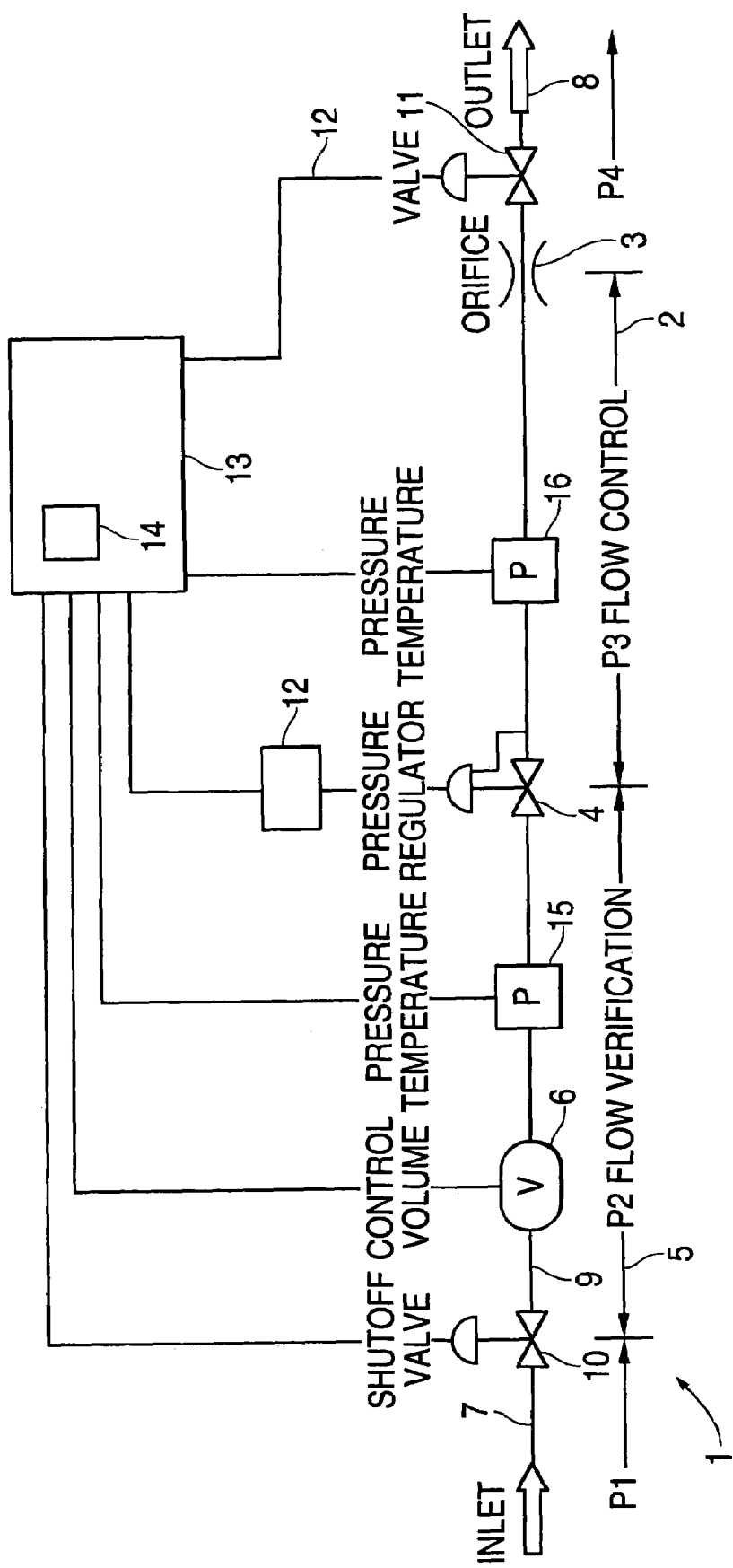
FIG. 1 is a schematic illustration of a flow control apparatus of the invention.

Referring now to FIG. 1 of the drawings, a flow control apparatus 1 of the invention has two main components and functions: a flow control system 2 of the apparatus in the area labeled P3 in FIG. 1 controls the flow of a pressurized gas through a flow line 9 of the apparatus by maintaining a known pressure upstream of a sonic orifice 3 through the operation of an adjustable pressure regulator 4; and a flow verification system 5 of the apparatus in the area labeled P2 in FIG. 1 provides a means to calibrate and check the flow rate of gas being delivered by the apparatus using the rate of pressure decay (blowdown) in a known volume 6, labeled control volume in FIG. 1, in the flow line of the apparatus upstream of the flow control system. The flow control apparatus is used in a fluid circuit for delivering pressurized gas at a controlled flow rate from a source of pressurized gas, represented by the left arrow at area P1 in FIG. 1 at apparatus inlet 7, to a destination, represented by the right arrow in area P4 in FIG. 1, in communication with apparatus outlet 8. This aspect of the flow control system is explained in greater detail in commonly owned U.S. Pat. Nos. 6,363,958 B1 and 6,450,200 B1.

The known volume/reference capacity/control volume 6 has a temperature sensing element thereon, represented by pressure/temperature sensor 15 shown immediately downstream of volume 6 in FIG. 1, to measure the temperature of the gas inside the reference capacity. An on-off valve 10 is provided in the flow line upstream of the control volume 6 to interrupt the flow of gas to the control volume during a measurement period of time. An on-off valve 11 is also provided downstream of fixed orifice 3 and pressure regulator 4 to start and stop a flow mode of the flow control apparatus during which gas is delivered for a delivery period of time. In this embodiment the set point of the pressure regulator is established by a pressure signal applied to the dome of the pressure regulator. The pressure signal is created by an electric/pneumatic converter 12 which generates a pressure proportional to the input voltage from controller 13. Any difference (error signal) between the set point or specified flow rate and the measured flow rate obtained using the flow verification system 5 is used to correct the pressure signal applied to the dome of the pressure regulator. For this purpose, the controller includes a reference memory 14 storing a mathematical relationship between the actual flow rate and the pressure signal applied to the regulator for reference in determining the size of the adjusting of the controlled flow rate so that the difference between the two values is reduced to zero, thus automatically recalibrating the flow control apparatus as discussed in assignee's aforementioned U.S. patents. The pressure/temperature sensor 15 includes a pressure transducer located in the line 9 adjacent the control volume 6 to measure a pressure drop of the gas in the control volume during a measurement period of time commencing after the start of a delivery period of time by interrupting flow to the control volume 6 with valve 10. A pressure/temperature sensor 26 downstream of the regulator in the flow line measures the temperature and pressure of the gas at the outlet of the pressure regulator.

Typical operation of the flow control apparatus 1 would proceed as follows. A command to initiate flow causes the outlet valve 11 to open and the pressure regulator 4 to build pressure upstream of the orifice 3 to the appropriate value as given by a factory calibration stored in the reference memory 14. Once steady flow has been established, the inlet valve 10 is closed. Initial molar volume of gas in the control volume 6 is calculated. When the factory set pressure drop has been achieved, the final molar volume of gas in the control volume is calculated and the inlet valve 10 re-opened. Flow rate during the blowdown process is calculated. This information is used by the controller to automatically update the factory calibration curve for the pressure regulator stored in reference memory 14. The operation is explained in detail below.

To determine the steady state flow or pressurized gas through the apparatus, the molar volume V of gas in the control volume 6 is calculated as a function of time.

The ideal Gas Law, $PV=nRT$ (equation 1), can be rewritten as $n=PV/RT$ (equation 2), Where:
n=number of moles,
P=absolute pressure,
V=volume,
R=universal gas constant (8.3145 J/mol K),
T=absolute temperature.

Flow rate (Q) can be expressed as the change in molar volume of gas over time (t):

$Q=(n_1-n_2)/t=(P_1V_2/RT_2)/t$ (equation 3)

Where:
$n_1$ $P_1$ $T_1$ represent the conditions at the beginning of the blowdown procedure, and
$n_2$ $P_2$ $T_2$ represent the conditions at the end of the blowdown procedure, after time t.

This can be used to calculate the flow rate of an ideal gas, that is, the gas molecules have no volume and do not interact.

The effects of non-ideal gases can be accounted for by incorporating the compressibility factor, Z, as follows:

$Q=(n_1-n_2)/t=(P_1V_1/Z_1RT_1-P_2V_2/Z_2RT_2)/T$ (equation 4)

Z can be calculated from the critical pressure and critical temperature of the gas, and knowing the current temperature and pressure.

When delivering process gas for semiconductor manufacture, it is necessary to complete the flow verification process as quickly as possible as the process run times can be very short sometimes only lasting a few seconds. Thus, a typical blowdown process must be completed in approximately 0.5 to 1.0 second. To avoid a problem of trying to measure $T_2$, that is, the temperature of the gas at the conclusion of the flow verification operation, according to the present invention for in-situ flow calculation a thermal reservoir 16 is provided within the control volume that will match the gas temperature when the initial molar volume of gas is calculated, and readily transfer heat to maintain a constant gas temperature as the gas expands. It is important to note that the temperature, $T_2$ indicated here is the temperature of the gas, not that of the surroundings. It is not necessary to drive the gas temperature to match that of the surroundings, only to drive the final gas temperature $T_2$ to match the initial gas temperature, $T_1$. Instead of trying to conduct heat from the outside, there is an advantage afforded by the thermal reservoir 16 of the invention which is de-coupled from ambient effects and instead is driven to the gas temperature during steady state flow. Thus, there is no need to delay operation of the flow control apparatus to wait for the gas to achieve thermal equilibrium with ambient conditions. Nor is there an impractical requirement to control the ambient conditions in a production gas delivery setting in order to use the flow control apparatus. Rather, it is sufficient that the gas temperature of the gas in the flow control apparatus of the invention be maintained constant (relative to itself) during the verification or blowdown procedure. Minimizing external effects during this operation assists in this effort.

Figure 2:
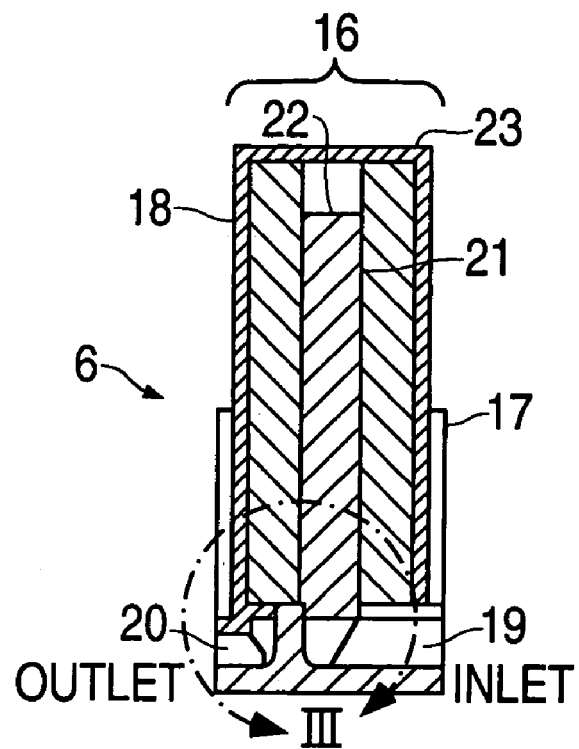
FIG. 2 is a cross sectional view through the control volume of the flow control apparatus of FIG. 1 showing the body forming the control volume, its inlet, and outlet, and a thermal reservoir located within the control volume with a gap between the thermal reservoir and the annular interior wall of the control volume.
Figure 3:
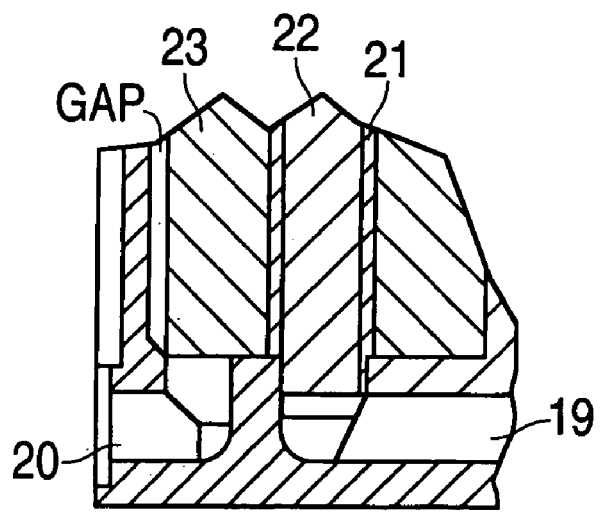
FIG. 3 is an enlarged cross sectional view of a portion of the control volume within the dashed line circle III in FIG. 2.
Figure 4:
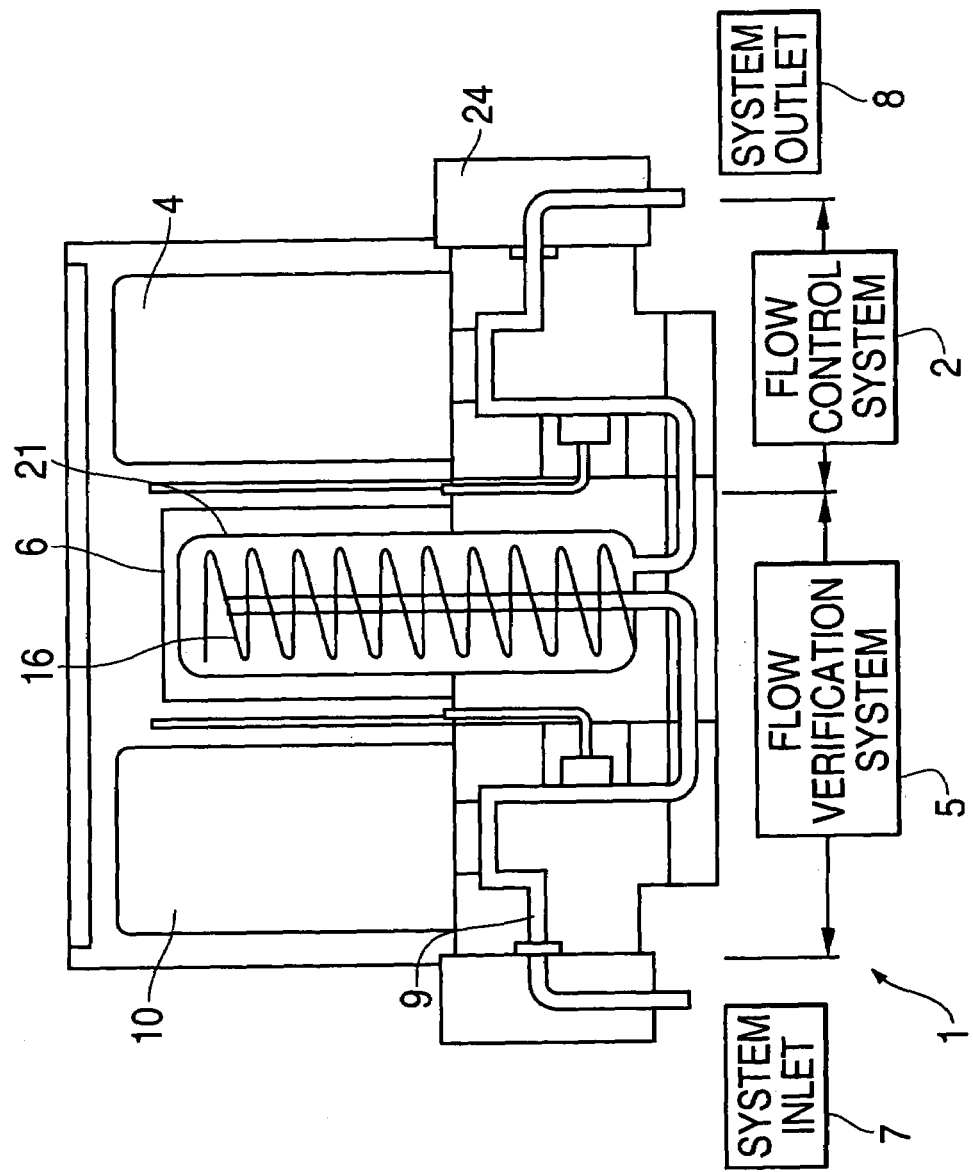
FIG. 4 is a cross sectional view of a gas manifold of the flow control apparatus showing the arrangement of the inlet, flow verification system, flow control system and outlet along a flow line through the manifold.

The control volume 6 with thermal reservoir 16 of the disclosed embodiment is shown in FIGS. 2–4. The control volume is formed by a body 17 and a cap 18 welded thereto to define an annular chamber. The body 17 is formed with an inlet 19 and outlet 20 for gas flow communication as part of the flow line 9 of the flow control apparatus. The body and cap of the control volume 6 are formed of stainless steel, 316L in the embodiment. The internal diameter of the annular chamber is 0.870 inch permitting gas flow through the chamber through between the inlet 19 and outlet 20. A center tube 21 is connected to the body 17 about the gas flow passage in communication with the inlet 19. Tube 21 diverts the flow of gas introduced to the control volume so that the entire volume of the control volume is involved in the flow of gas through the control volume to the outlet 20, assuring consistent temperature of the thermal reservoir 16 therein and the surrounding gas during steady state flow. The center tube in the embodiment is 0.25 inch diameter tubing formed of 316L stainless steel having a wall thickness of 0.070 inch.

The thermal reservoir 16 in the embodiment is preferably formed of fine wire with open spaces between sections of the wire through which gas can flow to transfer heat between the flowing gas and the thermal reservoir. The thermal reservoir is constructed as an inner wire heat exchanger 22 and an outer wire heat exchanger 23 in the disclosed embodiment. The heat exchangers are formed from wire screening, 28 mesh×0.013 wire of 316 stainless steel which is cut and rolled into cylindrical shapes to form the inner wire heat exchanger 22, which fits within the tube 21, and the outer wire heat exchanger 23, which is positioned about the outside of the tube 21. For constructing the outer wire heat exchanger 23, a rectangular section of the wire screen was cut to approximately 2.33 inches wide and 24 inches long. The rectangular section of wire screen was then rolled into a cylindrical shape to 0.86 inch maximum outside diameter and 0.26 inch minimum inside diameter. When located about the center tube 21, a gap of 0.010 inch remains between the outside diameter of the outer wire heat exchanger 23 and the interior wall of the annular control volume to minimize heat transfer to the exterior of the known volume and de-couple the thermal reservoir from ambient effects.

The inner wire heat exchanger 22 was formed similarly from a section of wire screen approximately 0.71 inch wide and 2.4 inches long which was rolled into a cylindrical shape to 0.180 inch maximum outside diameter and cut to a length of 2.20 inches for receipt within the inside diameter of the center tube 21. The density of the wire heat exchangers is 20% of solid. The fine wire of the thermal reservoir has a diameter of approximately 0.010 inch.

Because the wire of the thermal reservoir has a low mass relative to its surface area, it quickly comes to match the gas temperature of gas flowing through the flow control apparatus 1 during steady state flow. The average open space between sections of wire in the thermal reservoir is approximately 0.010 inch, ensuring that the wire is a readily available thermal reservoir to transfer heat back to the gas during the verification process. As noted, the thermal reservoir is centered on the center tube 21, leaving a small gap between the heat exchanger and the control volume body. This minimizes the heat transfer to the exterior of the control volume so that the gas is maintained at its own temperature, with minimal effect from external influences during the verification process. The flow control apparatus 1 is shown in an implementation along a gas manifold 24 in FIG. 4 wherein the thermal reservoir 16 is shown schematically about the center tube 21 in the control volume 6 of the apparatus. This construction lends itself to use in a production setting, for example delivering process gas in the manufacturer of semiconductors wherein the process gas must be delivered at a control flow rate to a semiconductor manufacturing tool.

A flow control apparatus of the invention built with an on-board flow verification system according to the invention conveys considerable advantages to the process engineer. The flow control apparatus can be used with any gas, as opposed to the traditional mass flow controller method of calibrating a device for a specific gas, or using a surrogate gas to approximate the actual gas calibration. With the apparatus of the invention, a process engineer can bring on line a new gas mixture immediately, instead of waiting for a mass flow controller manufacturer to develop a calibration based on a surrogate gas. The flow control apparatus of the invention will also provide accurate flow control under a variety of conditions, eliminating the effects of pressure drop in other system components, varying ambient conditions, and sensor drift, resulting in a system that can maintain 1% accuracy when installed in the process equipment as opposed to current mass flow controllers, which can only guarantee 5% accuracy when installed.

While there has been illustrated and described a particular embodiment of the present invention, it will be appreciated that numerous changes and modifications will occur to those skilled in the art and it is intended in the following claims to cover all those changes and modifications which fall within the true spirit and scope of the present invention.

We claim:

1. A flow control apparatus for use within a fluid circuit having a source of pressurized gas to be delivered at a controlled flow rate to a destination by said flow control apparatus, said flow control apparatus comprising:
   a flow line through which gas from a source of pressurized gas can be delivered;
   a flow control system in said flow line to establish a controlled flow rate for delivery of gas at a specified flow rate in accordance with a calibration of said flow control system;
   a flow verification system including a known volume in said flow line upstream of said flow control system, a pressure sensor to measure gas pressure drop relative to time in the known volume when gas flow to the known volume is interrupted while gas flow from the known volume is continued, and a controller to calculate the actual flow rate of gas being delivered by said flow control apparatus using said measurement and, in case said actual flow rate does not agree with said specified flow rate, recalibrate said flow control system;
   a thermal reservoir provided in the known volume of the flow verification system, the thermal reservoir being de-coupled from ambient effects so that the temperature of the thermal reservoir will be driven to the gas temperature during steady state flow of gas through the known volume, and will transfer heat to maintain a constant gas temperature during gas expansion.

2. The flow control apparatus according to claim 1, wherein said thermal reservoir is provided in said known volume with a gap between said thermal reservoir and an interior wall of a body forming said known volume to minimize heat transfer to the exterior of the known volume and de-couple the thermal reservoir from ambient effects.

3. The flow control apparatus according to claim 1, wherein said thermal reservoir is formed of fine wire with open spaces between sections of wire through which gas can flow to transfer heat between the flowing gas and said thermal reservoir.

4. The flow control apparatus according to claim 1, further comprising a tube in said known volume about which said thermal reservoir is provided and through which gas flowing through the known volume flows.

5. The flow control apparatus according to claim 1, wherein said flow control system includes a pressure regulator in said flow line to establish a regulated gas pressure in said line, and a fixed office in said flow line downstream of said pressure regulator, said pressure regulator having an adjustable pressure setting for adjusting said controlled flow rate.

6. The flow control apparatus according to claim 5, wherein said pressure regulator is a dome loaded pressure regulator whose pressure setting is established by a fluid pressure applied to the dome of the pressure regulator.

7. A flow verification system for measuring gas pressure drop relative to time in a known volume to calculate gas flow rate, the system comprising:
   a known volume through which gas can be flowed;
   a thermal reservoir provided in the known volume, the thermal reservoir being de-coupled from ambient effects so that the temperature of the thermal reservoir will be driven to the gas temperature during steady state flow of gas through the known volume;
   means for interrupting gas flow to the known volume while continuing the flow gas from the known volume;
   a pressure sensor to measure a pressure drop of said gas in said known volume as the thermal reservoir transfers heat to maintain a constant gas temperature during gas expansion.

8. The flow verification system according to claim 7, wherein said thermal reservoir is provided in said known volume with a gap between said thermal reservoir and an interior wall of a body forming said known volume to minimize heat transfer to the exterior of the known volume and de-couple the thermal reservoir from ambient effects.

9. The flow verification system according to claim 7, wherein said thermal reservoir is formed of fine wire with open spaces between sections of wire through which gas can flow to transfer heat between the flowing gas and said thermal reservoir.

10. The flow verification system according to claim 7, further comprising a tube in said known volume about which said thermal reservoir is provided and through which gas flowing through the known volume flows.

11. The flow verification system according to claim 7, in combination with a flow control system to receive gas from said known volume and deliver the gas to a destination at a specified flow rate.

12. The flow verification system according to claim 11, including means for calculating the actual flow rate of gas being delivered by said flow control system using a measured gas pressure drop relative to time in the known volume, and verifying whether or not the actual flow rate corresponds to said specified flow rate of said flow control system.

13. A method of measuring gas pressure drop relative to time in a known volume to calculate gas flow rate comprising:
flowing gas through a known volume in which a thermal reservoir de-coupled from ambient effects is provided so that the temperature of the thermal reservoir will be driven to the gas temperature during steady state flow of gas through the known volume;
interrupting gas flow to the known volume while continuing gas flow from the known volume;
measuring gas pressure drop relative to time in the known volume as the thermal reservoir transfers heat to maintain a constant gas temperature as the gas expands.

14. The method of claim 13, including providing said thermal reservoir in said known volume with a gap between said thermal reservoir and an internal wall of a body forming said known volume to minimize heat transfer to the exterior of the known volume and de-couple the thermal reservoir from ambient effects.

15. The method of claim 13, including forming the thermal reservoir of fine wire with open spaces between sections of wire through which gas can flow to transfer heat between the flowing gas and said thermal reservoir.

16. The method of claim 13, including providing said thermal reservoir about a tube which extends through the thermal reservoir, and flowing gas in the known volume through the tube and then through the thermal reservoir.

17. The method of claim 13, wherein the gas is a process gas for semiconductor manufacturing, and wherein said method of measuring is performed while delivering process gas through a flow control system to an apparatus for semiconductor manufacturing.

18. The method according to claim 17, including calculating the actual gas flow rate of gas being delivered by the flow control system using said measured gas pressure drop relative to time, and using the calculated flow rate for verification of a specified flow rate of said flow control system for said delivering.

* * * * *